United States Patent
Wu

(10) Patent No.: US 8,457,482 B2
(45) Date of Patent: Jun. 4, 2013

(54) ACTUATOR AND CAMERA MODULE HAVING SAME

(75) Inventor: Sung-Ching Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 86 days.

(21) Appl. No.: 13/275,331

(22) Filed: Oct. 18, 2011

(65) Prior Publication Data

US 2013/0045000 A1 Feb. 21, 2013

(30) Foreign Application Priority Data

Aug. 19, 2011 (TW) .............................. 100129653 A

(51) Int. Cl.
*G03B 17/00* (2006.01)
*G02B 7/02* (2006.01)

(52) U.S. Cl.
USPC ............................................ 396/85; 359/824

(58) Field of Classification Search
USPC ...... 396/85–86, 72; 359/696, 824; 348/240.3, 348/345
See application file for complete search history.

(56) References Cited

U.S. PATENT DOCUMENTS

| 7,511,904 | B2 * | 3/2009 | Hu et al. | 359/824 |
| 7,826,734 | B2 * | 11/2010 | Shirono et al. | 396/85 |
| 8,040,623 | B2 * | 10/2011 | Shyu et al. | 359/824 |
| 8,059,346 | B2 * | 11/2011 | Henderson | 359/824 |
| 2011/0292273 | A1 * | 12/2011 | Kim et al. | 348/345 |

* cited by examiner

*Primary Examiner* — Christopher Mahoney
(74) *Attorney, Agent, or Firm* — Altis Law Group, Inc.

(57) ABSTRACT

An exemplary actuator includes a base, a stationary frame mounted on the base, a moveable frame received in the stationary frame and supported on the base when the moveable frame is in a lowest position, and a driving unit received in the stationary frame and supported on the base. The moveable frame includes a frame body and a protrusion outwardly protruding from an outer wall of a corner of the frame body. The driving unit includes two parallel piezoelectric plates and two parallel resilient plates. The piezoelectric plates and the resilient plates are connected to each other end-to-end and cooperatively form a receiving hole therebetween. The protrusion is received in the receiving hole. The two resilient plates apply a preload to opposite side surfaces of the protrusion and retain the protrusion in position in the receiving hole.

20 Claims, 5 Drawing Sheets

ACTUATOR AND CAMERA MODULE HAVING SAME

BACKGROUND

1. Technical Field

The present disclosure relates to an actuator and a camera module having the actuator.

2. Description of Related Art

With ongoing developments in microcircuitry and multimedia technology, camera modules have become widely used in a variety of consumer electronic devices, such as cellular telephones, notebook computers, digital cameras, personal digital assistants (PDAs), etc. A typical camera module includes a lens module and an image sensor. In addition, there is a growing demand for developing more camera modules with multiple functions, such as camera modules having actuators with an auto-focus function.

One type of actuator is a step motor, which is used to move the lens module along an optical axis in a camera module to achieve the auto-focus function. However, the step motor needs many transmission mechanisms, such as a driving gear and a number of driven gears, to convert rotational movement of the lens module into linear movement along the optical axis. These components take up much space, thus adding to the size of the camera module.

Therefore, it is desirable to provide an actuator and a camera module having the actuator, which can overcome or at least alleviate the limitations described.

DETAILED DESCRIPTION

Figure 1:
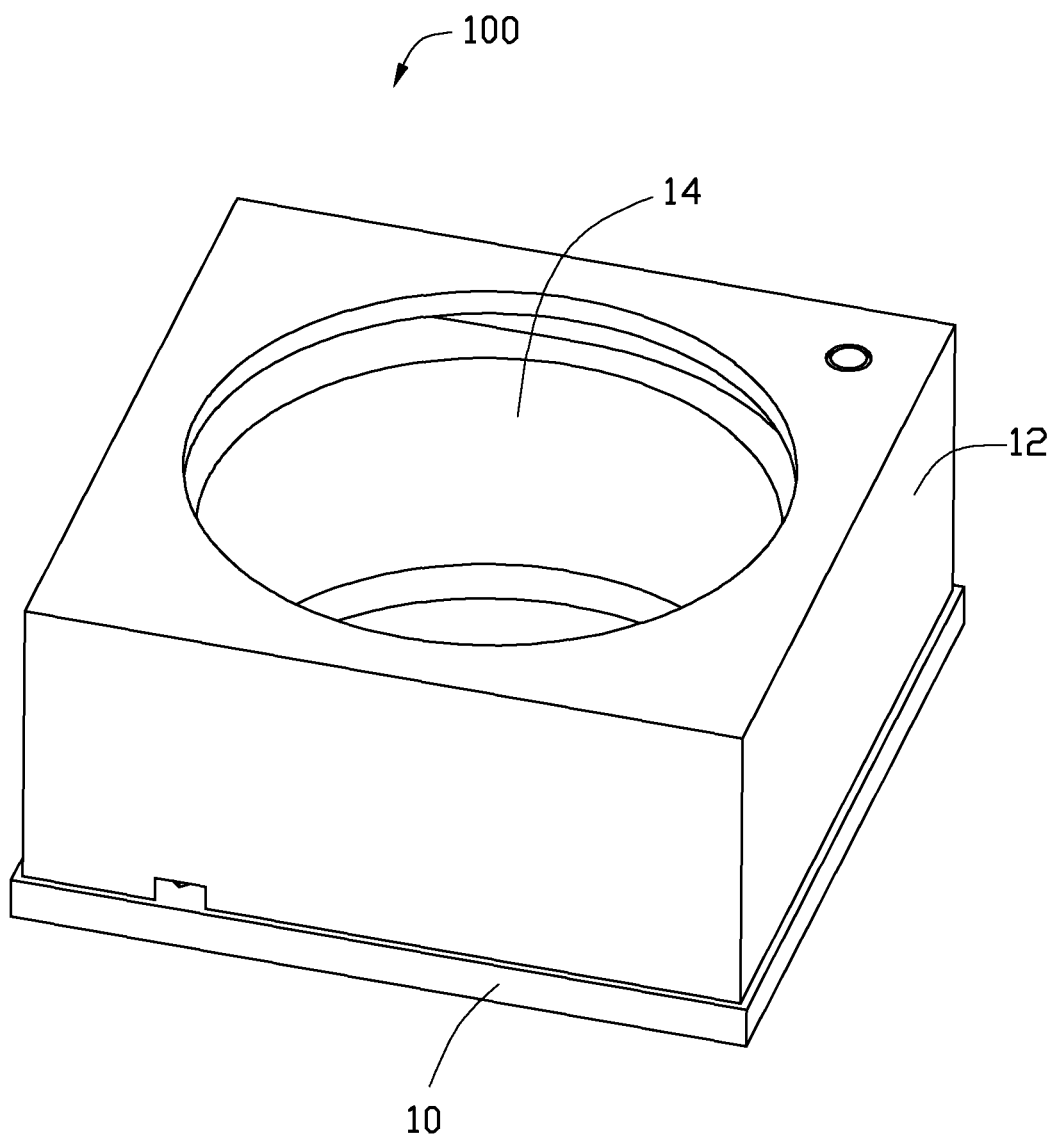
FIG. 1 is an isometric view of an actuator, according to a first exemplary embodiment.
Figure 2:
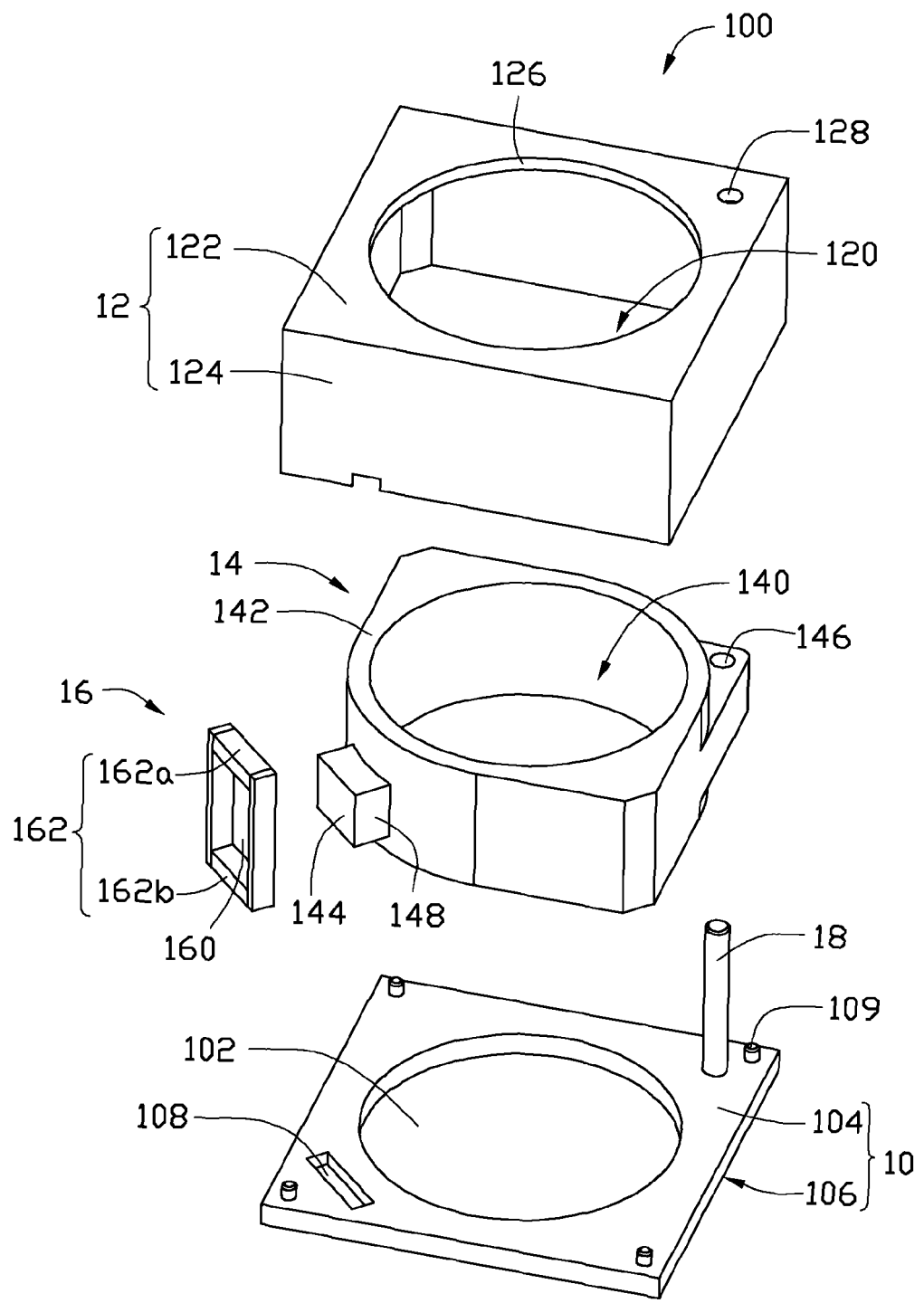
FIG. 2 is an exploded view of the actuator of FIG. 1.
Figure 3:
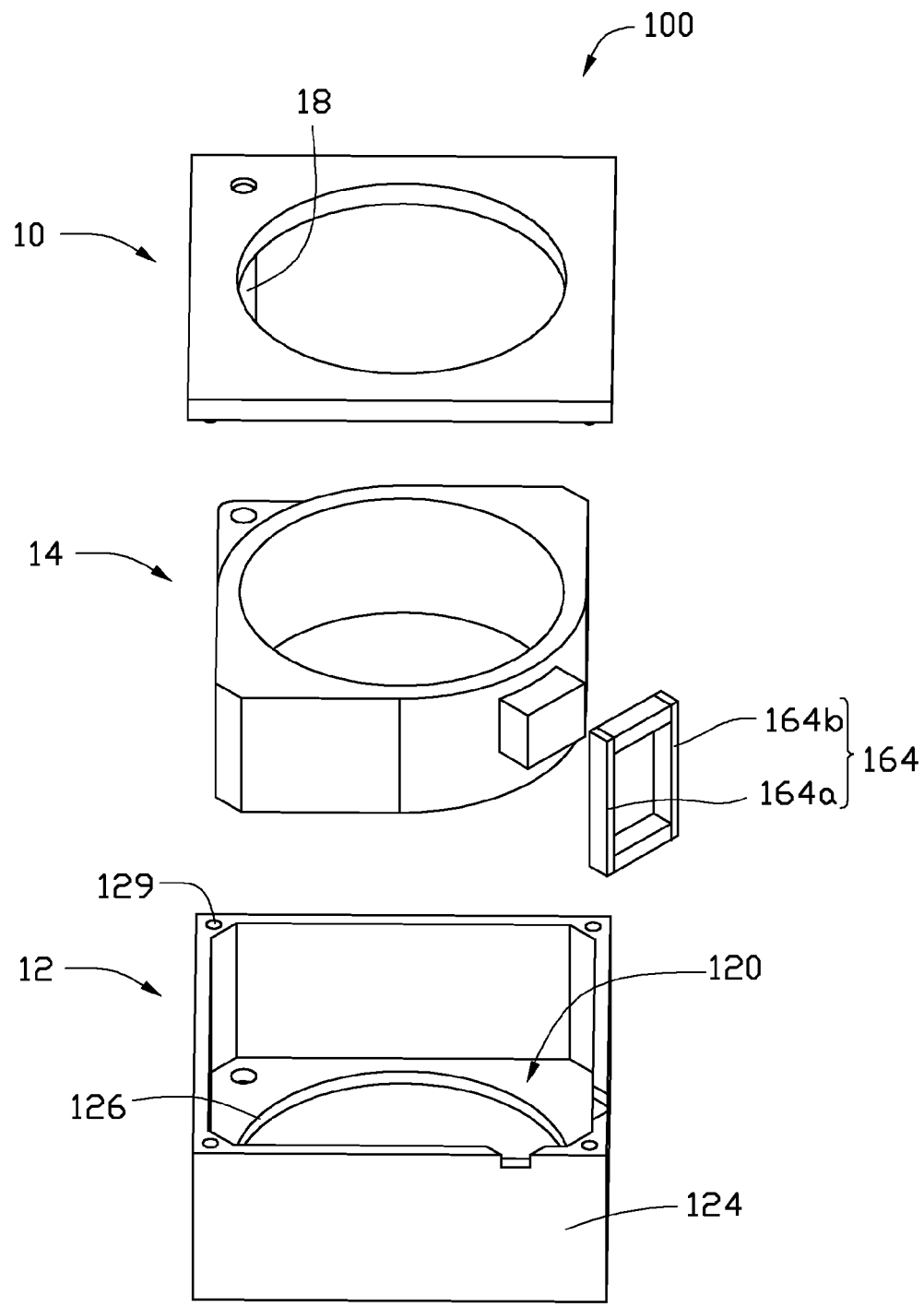
FIG. 3 is similar to FIG. 2, but viewed from another aspect.

Referring to FIGS. 1-3, an actuator 100, according to a first exemplary embodiment, includes a base 10, a stationary frame 12, a moveable frame 14, a driving unit 16, and a guide pole 18.

The base 10 is substantially cuboid, and is generally in the form of a flat plate. The base 10 includes an upper surface 104 and a lower surface 106. The upper surface 104 and the lower surface 106 are located at opposite top and bottom sides of the base 10. The base 10 defines a circular aperture 102 and a squared groove 108. The aperture 102 is positioned in a central portion of the base 10, and extends through both the upper surface 104 and the lower surface 106. The groove 108 is separate from (i.e., independent of) the aperture 102. The groove 108 passes through the upper surface 104, but does not reach the lower surface 106. Four locating posts 109 perpendicularly extend from the four corners of the upper surface 104.

The stationary frame 12 includes a top panel 122, and four side panels 124 perpendicularly extending from four peripheral sides of the top panel 122. The top panel 122 and the side panels 124 cooperatively define a first receiving room 120. The top panel 122 defines a circular light incident hole 126 in a central portion thereof, and a fixing hole 128 in a corner thereof. The fixing hole 128 is separate from (i.e., independent of) the light incident hole 126. Four engagement holes 129 are defined in four corners of the stationary frame 12 away from the top panel 122. In particular, each of the four engagement holes 129 is located at a corner of the stationary frame 12 where two corresponding side panels 124 meet. The four engagement holes 129 correspond to the four locating posts 109.

The moveable frame 14 is received in the first receiving room 120 and supported by the upper surface 104 of the base 10 when the moveable frame 14 is in a lowest position. The moveable frame 14 includes a frame body 142 and a protrusion 144. The frame body 142 is substantially cuboid, and defines a second receiving room 140 and a through hole 146. The second receiving room 140 is positioned in a central portion of the frame body 142 for receiving a lens module 30 (shown in FIG. 4). The through hole 146 is positioned at a corner of the frame body 142 and is separate from (i.e., independent of) the second receiving room 140. The protrusion 144 is substantially cuboid. The protrusion 144 protrudes outwardly from an outer wall of a corner of the frame body 142 away from the second receiving room 140. The protrusion 144 includes two parallel, vertical side surfaces 148.

The driving unit 16 is received in the first receiving room 120. The driving unit 16 includes two horizontal, parallel piezoelectric plates 162 (i.e., an upper piezoelectric plate 162a and a lower piezoelectric plate 162b), and two vertical, parallel resilient plates 164 (i.e., a left resilient plate 164a and a right resilient plate 164b). The upper piezoelectric plate 162a, the left resilient plate 164a, the lower piezoelectric plate 162b, and the right resilient plate 164b connect each other end-to-end and cooperatively form a squared receiving hole 160 therebetween. The lower piezoelectric plate 162b is engaged in the groove 108 with adhesive. The adhesive is arranged at a center portion of the lower piezoelectric plate 162b and does not reach opposite ends of the lower piezoelectric plate 162b, such that the driving unit 16 is fixed in the groove 108 and the lower piezoelectric plate 162b can elongate when electrified. The receiving hole 160 receives the protrusion 144. The left resilient plate 164a and the right resilient plate 164b abut against the two side surfaces 148 respectively, and friction between the left and right resilient plates 164a, 164b and the two side surfaces 148 holds the protrusion 144 in position between the left and right resilient plates 164a, 164b. In other words, the left and right resilient plates 164a, 164b apply a preload to the protrusion 144, and the preload can fully counteract the total gravity acting on the moveable frame 14 and the lens module 30. In this embodiment, the upper piezoelectric plate 162a and the lower piezoelectric plate 162b are made of the same piezoelectric material. If an electric current is applied to the upper piezoelectric plate 162a or the lower piezoelectric plate 162b, the upper piezoelectric plate 162a or the lower piezoelectric plate 162b mechanically deforms. The left resilient plate 164a and the right resilient plate 164b are made of resilient material, such as plastic. The piezoelectric plates 162 are attached to the resilient plates 164 with adhesive.

The guide pole 18 extends through the through hole 146. A bottom end of the guide pole 18 is fixed to the base 10, and the other top end of the guide pole 18 is engaged in the fixing hole 128. In this embodiment, the guide pole 18 is made of stainless steel.

In assembly of the actuator 100, the bottom end of the guide pole 18 is fixed to the base 10. The moveable frame 14 is supported by the upper surface 104, and the guide pole 18 extends through the through hole 146. The lower piezoelectric plate 162b is engaged in the groove 108 with adhesive. The receiving hole 160 receives the protrusion 144. The left resilient plate 164a and the right resilient plate 164b apply a preload to the protrusion 144, and cooperatively retain the two side surfaces 148 of the protrusion 144, respectively. The locating posts 149 engage in the respective engagement holes 129 so that the stationary frame 12 is mounted on the base 10. The moveable frame 14, the driving unit 16, and the guide pole 18 are received in the first receiving room 18. The center of the light incident hole 126 is aligned with a center of the second receiving room 140 and the center of the aperture 102.

In another embodiment, the stationary frame 12 may be attached to the base 10 with adhesive.

When the actuator 100 is in use, if a current is applied to the upper piezoelectric plate 162a and no current is applied to the lower piezoelectric plate 162b, the upper piezoelectric plate 162a elongates and the length of the lower piezoelectric plate 162b remains unchanged. The left resilient plate 164a and the right resilient plate 164b each produce a wave deformation from the upper piezoelectric plate 162a to the lower piezoelectric plate 162b. The top-down wave deformations drive the protrusion 144 to move downward, and correspondingly an opposite corner of the moveable frame 14 moves downward along the guide pole 18. Thereby, the moveable frame 14 together with the lens module 30 is driven to move downward along the guide pole 18. When the moveable frame 14 reaches a desired position, the current applied to the upper piezoelectric plate 162a is cut off. The moveable frame 14 and the lens module 30 can remain in the desired position and achieve auto-focus because a load (similar to the preload described above) applied by the left and right resilient plates 164a, 164b can overcome the total gravity acting on the moveable frame 14 and the lens module 30.

If a current is applied to the lower piezoelectric plate 162b and no current is applied to the upper piezoelectric plate 162a, the lower piezoelectric plate 162b elongates and the length of the upper piezoelectric plate 162a remains unchanged. The left resilient plate 164a and the right resilient plate 164b each produce a wave deformation from the lower piezoelectric plate 162b to the upper piezoelectric plate 162a. The bottom-up wave deformations drive the protrusion 144 to move upward, and correspondingly the opposite corner of the moveable frame 14 moves upward along the guide pole 18. Thereby, the moveable frame 14 together with the lens module 30 is driven to move upward along the guide pole 18. When the moveable frame 14 reaches a desired position, the current applied to the lower piezoelectric plate 162b is cut off. The moveable frame 14 and the lens module 30 can remain in the desired position and achieve auto-focus because a load (similar to the preload described above) applied by the left and right resilient plates 164a, 164b can overcome the total gravity acting on the moveable frame 14 and the lens module 30.

If the same current is applied to the upper piezoelectric plate 162a and the lower piezoelectric plate 162b successively, the upper and lower piezoelectric plates 162a, 162b elongate in that order. The left resilient plate 164a and the right resilient plate 164b each produce a wave deformation from the upper piezoelectric plate 162a to the lower piezoelectric plate 162b because the length of the upper piezoelectric plate 162a is larger than that of the lower piezoelectric plate 162b after the current is first applied to the upper piezoelectric plate 162a. The top-down wave deformations drive the protrusion 144 to move downward, and correspondingly the opposite corner of the moveable frame 14 moves downward along the guide pole 18. Thereby, the moveable frame 14 together with the lens module 30 is driven to move downward along the guide pole 18. When the moveable frame 14 reaches a desired position, the current applied to the two piezoelectric plates 162a, 162b is cut off. The moveable frame 14 and the lens module 30 can remain in the desired position and achieve auto-focus because a load (similar to the preload described above) applied by the left and right resilient plates 164a, 164b can overcome the total gravity acting on the moveable frame 14 and the lens module 30.

If the same current is applied to the lower piezoelectric plate 162b and the upper piezoelectric plate 162a successively, the lower and upper piezoelectric plates 162b, 162a elongate in that order. The left resilient plate 164a and the right resilient plate 164b each produce a wave deformation from the lower piezoelectric plate 162b to the upper piezoelectric plate 162a because the length of the lower piezoelectric plate 162b is larger than that of the upper piezoelectric plate 162a after the current is first applied to the lower piezoelectric plate 162b. The bottom-up wave deformations drive the protrusion 144 to move upward, and correspondingly the opposite corner of the moveable frame 14 moves upward along the guide pole 18. Thereby, the moveable frame 14 together with the lens module 30 is driven to move upward along the guide pole 18. When the moveable frame 14 reaches a desired position, the current applied to the two piezoelectric plates 162a, 162b is cut off. The moveable frame 14 and the lens module 30 can remain in the desired position and achieve auto-focus because a load (similar to the preload described above) applied by the left and right resilient plates 164a, 164b can overcome the total gravity acting on the moveable frame 14 and the lens module 30.

The driving unit 16 and the protrusion 144 cooperatively achieve auto-focus of the lens module 30, avoiding the need for many transmission mechanisms. Accordingly, the size of the actuator 100 can be substantially reduced.

Figure 4:
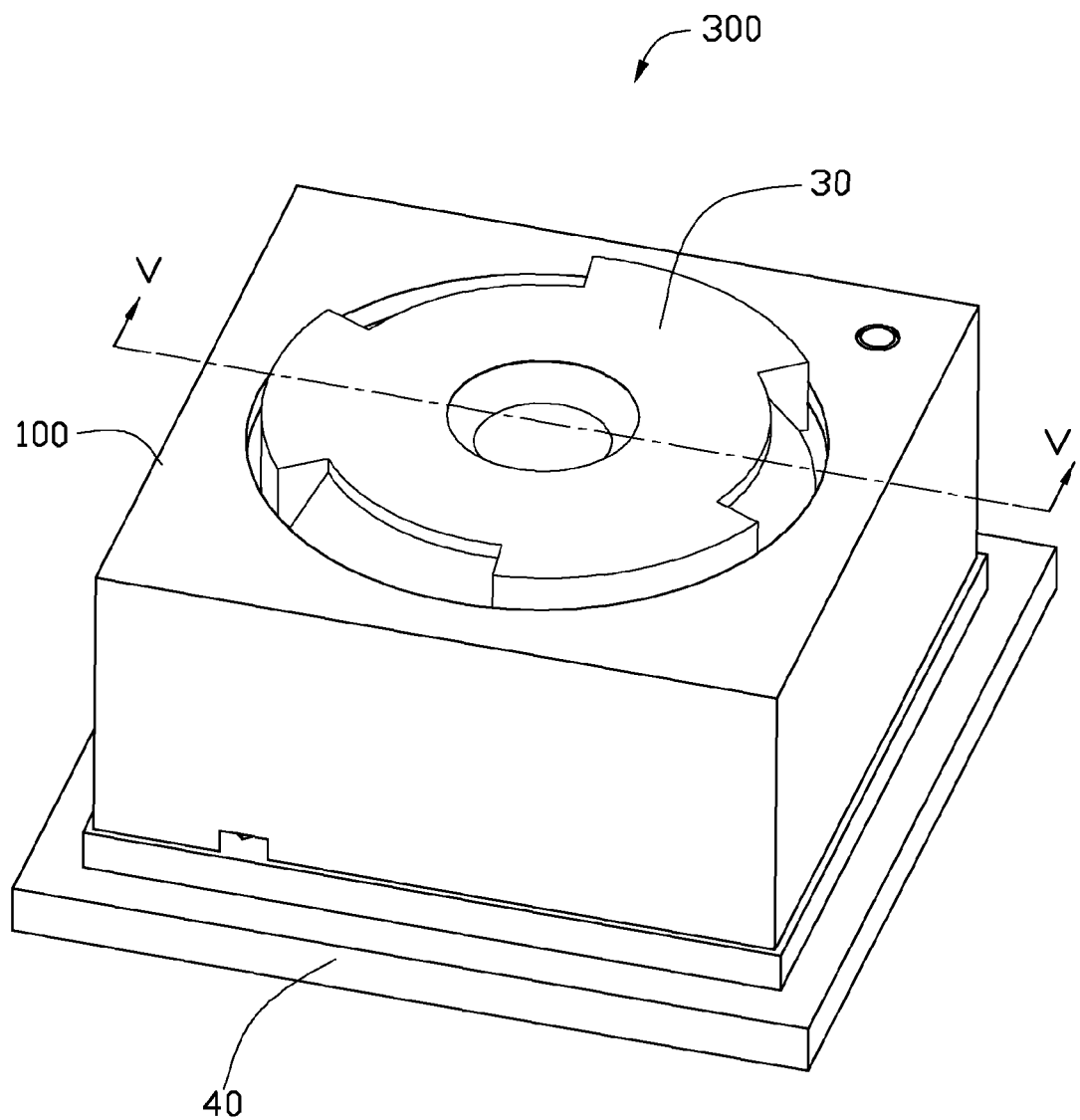
FIG. 4 is an isometric view of a camera module, according to a second exemplary embodiment.
Figure 5:
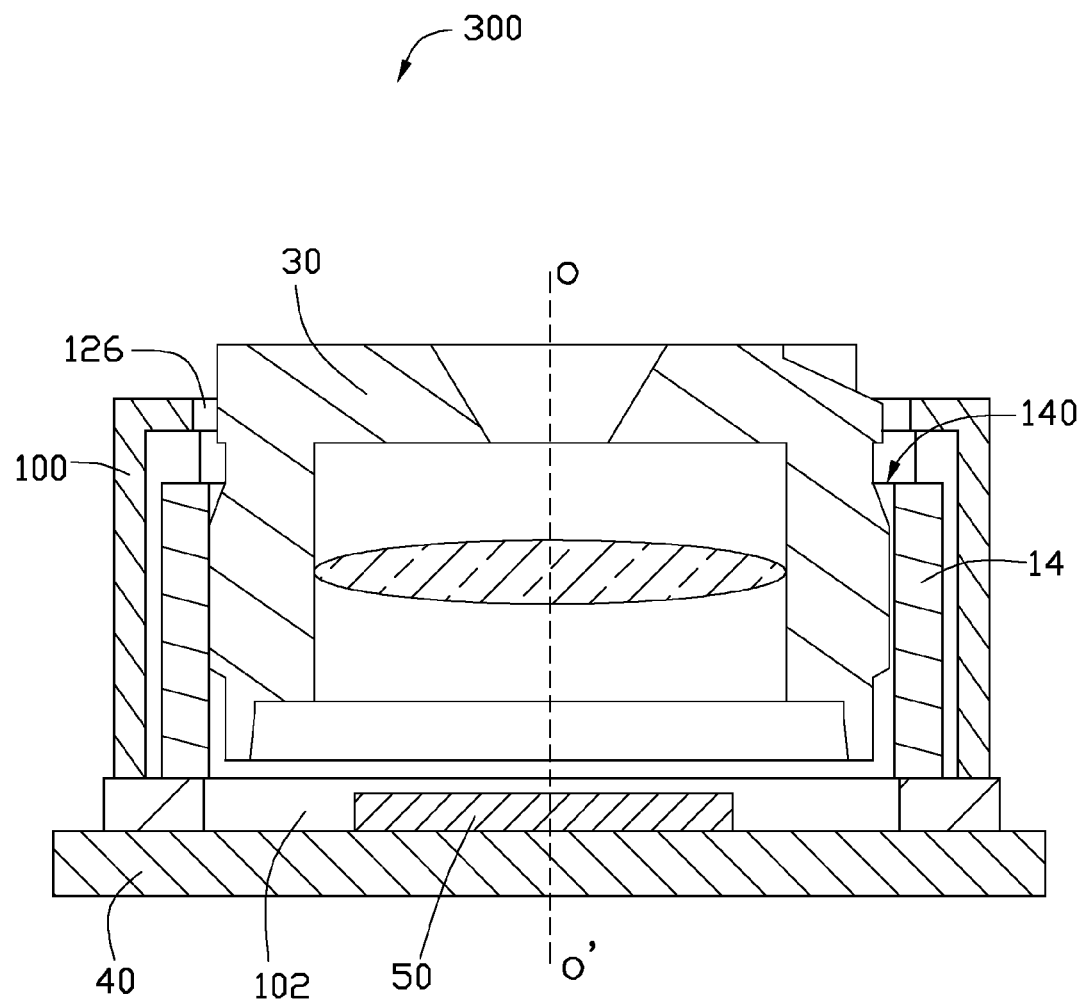
FIG. 5 is a sectional view of the camera module of FIG. 4, taken along line V-V thereof.

Referring to FIGS. 4-5, a camera module 300, according to a second exemplary embodiment, is shown. The camera module 300 includes the actuator 100, the lens module 30, a substrate 40, and an image sensor 50. The lens module 30 is received in the second receiving room 140. The actuator 100 is supported by the substrate 40. The image sensor 50 is positioned on the substrate 40 and received in the aperture 102. An optical axis OO' of the lens module 30 is aligned with a center of the image sensor 50 and the center of the aperture 105. When the camera module 300 is in use, the moveable frame 14 including the lens module 30 moves along the optical axis OO', achieving an auto-focus function.

The advantages of the camera module 300 of the second embodiment are similar to those of the actuator 100 of the first embodiment.

Even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An actuator comprising:
a base;
a stationary frame mounted on the base;
a moveable frame received in the stationary frame and supported on the base when the moveable frame is in a lowest position, the moveable frame comprising a frame body and a protrusion protruding outwardly from an outer wall of a corner of the frame body; and
a driving unit received in the stationary frame and supported on the base, the driving unit comprising two parallel piezoelectric plates and two parallel resilient plates, the piezoelectric plates and the resilient plates connected to each other end-to-end and cooperatively forming a receiving hole therebetween, the protrusion received in the receiving hole, and the two resilient plates applying a preload to opposite side surfaces of the protrusion and retaining the protrusion in position in the receiving hole.

2. The actuator of claim 1, wherein the stationary frame is attached to the base with adhesive.

3. The actuator of claim 1, wherein the stationary frame is engaged with the base.

4. The actuator of claim 1, wherein the piezoelectric plates and the resilient plates are attached to each other end-to-end with adhesive.

5. The actuator of in claim 1, further comprising a guide pole, wherein the guide pole extends through a diagonally opposite corner of the frame body of the moveable frame, a bottom end of the guide pole is fixed to the base, and the other top end of the guide pole is fixed to the stationary frame.

6. The actuator of claim 5, wherein the guide pole is made of stainless steel.

7. The actuator of claim 5, wherein the stationary frame comprises a top panel, and four side panels perpendicularly extending from peripheral sides of the top panel, the top panel defines a light incident hole, the top panel and the four side panels cooperatively form a first receiving room receiving the moveable frame and the driving unit, the frame body defines a second receiving room, the base defines an aperture, and the center of the light incident hole is aligned with a center of the second receiving room and the center of the aperture.

8. The actuator of claim 7, wherein the frame body defines a through hole in the diagonally opposite corner thereof, the through hole is separated from the second receiving room, the top panel defines a fixing hole separated from the light incident hole, the guide pole extends through the through hole, and the other top end of the guide pole is engaged in the fixing hole.

9. A camera module comprising:
an actuator comprising:
a base;
a stationary frame mounted on the base;
a moveable frame received in the stationary frame and supported on the base when the moveable frame is in a lowest position, the moveable frame comprising a frame body and a protrusion protruding outwardly from an outer wall of a corner of the frame body; and
a driving unit received in the stationary frame and supported on the base, the driving unit comprising two parallel piezoelectric plates and two parallel resilient plates, the piezoelectric plates and the resilient plates connected to each other end-to-end and cooperatively forming a receiving hole therebetween, the protrusion received in the receiving hole, and the two resilient plates applying a preload to opposite side surfaces of the protrusion and retaining the protrusion in position in the receiving hole;
a lens module received in the moveable frame;
a substrate supporting the actuator; and
an image sensor received in the base and supported by the substrate, an optical axis of the lens module aligned with a center of the image sensor.

10. The camera module of claim 9, wherein the stationary frame is attached to the base with adhesive.

11. The camera module of claim 9, wherein the stationary frame is engaged with the base.

12. The camera module of claim 9, wherein the piezoelectric plates and the resilient plates are attached to each other end-to-end with adhesive.

13. The camera module of claim 9, wherein the actuator further comprises a guide pole extending through a diagonally opposite corner of the frame body of the moveable frame, a bottom end of the guide pole is fixed to the base, and the other top end of the guide pole is fixed to the stationary frame.

14. The camera module of claim 13, wherein the guide pole is made of stainless steel.

15. The camera module of claim 13, wherein the stationary frame comprises a top panel, and four side panels perpendicularly extending from peripheral sides of the top panel, the top panel defines a light incident hole, the top panel and the four side panels cooperatively form a first receiving room receiving the moveable frame and the driving unit, the frame body defines a second receiving room, the base defines an aperture, and the center of the light incident hole is aligned with a center of the second receiving room and the center of the aperture.

16. The camera module of claim 15, wherein the frame body defines a through hole in the diagonally opposite corner thereof, the through hole is separated from the second receiving room, the top panel defines a fixing hole separated from the light incident hole, the guide pole extends through the through hole, and the other top end of the guide pole is engaged in the fixing hole.

17. An actuator comprising:
a base;
a stationary frame mounted on the base;
a moveable frame received in the stationary frame and supported on the base when the moveable frame is in a lowest position, the moveable frame comprising an outer protrusion, and the moveable frame configured for receiving a lens module;
a guide pole fixed on the base and extending through the moveable frame; and
a driving unit received in the stationary frame and supported on the base, the driving unit comprising two parallel piezoelectric plates and two parallel resilient plates, the piezoelectric plates and the resilient plates connected to each other end-to-end and cooperatively forming a receiving hole therebetween, the protrusion received in the receiving hole, the two resilient plates each configured for producing a wave deformation when current is applied to either or both of the piezoelectric plates with the wave deformations of the resilient plates driving the protrusion and hence the moveable frame together with the lens module upward or downward along the guide pole.

18. The actuator of claim 17, wherein the stationary frame is attached to the base with adhesive.

19. The actuator of claim 17, wherein the stationary frame is engaged with the base.

20. The actuator of claim 17, wherein the piezoelectric plates and the resilient plates are attached to each other end-to-end with adhesive.

* * * * *